Oct. 20, 1942.　　　　H. STALEY　　　　2,299,115
NO SLIP PARTING CHOCK
Filed Jan. 8, 1942
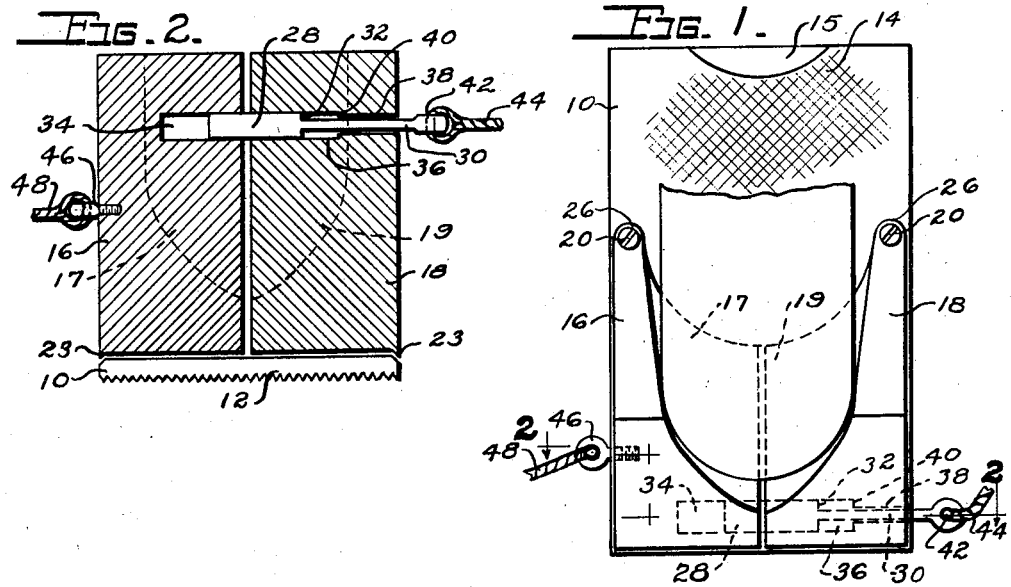
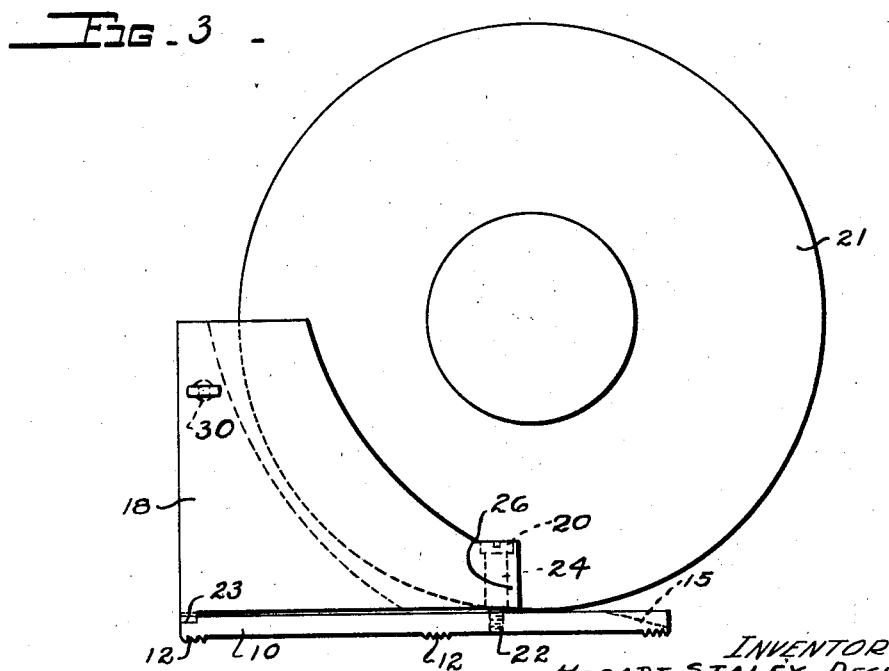
INVENTOR:
HOBART STALEY, DECEASED
JENNIE M. STALEY
(ADMINISTRATRIX)

Patented Oct. 20, 1942

2,299,115

UNITED STATES PATENT OFFICE 2,299,115

NO-SLIP PARTING CHOCK

Hobart Staley, deceased, late of Dayton, Ohio, by Jennie M. Staley, administratrix, Dayton, Ohio Application January 8, 1942, Serial No. 426,044

6 Claims. (Cl. 188—32)

(Granted under the act of March 3, 1883, as amended April 30, 1928; 370 O. G. 757)

The invention described herein may be manufactured and used by or for Government for governmental purposes, without the payment of any royalty thereon.

This invention relates to a wheel chock and is particularly applicable to aircraft.

When an airplane is preparing for take-off and the engine is idling, the rotating propeller exerts a constant effort to move the plane forward, and it is the practice, in order to hold the plane stationary during this period, to block one or more of the landing gear wheels.

While the forward urge due to the idling propeller is not great, there is nevertheless enough force to pinch the blocks, once they are put under the wheels and the engine started, and thereby make them difficult to remove when forward movement of the plane is desired. This difficulty is increased by the more or less in accessible location of the blocks under the wheels.

It is therefore an object of this invention to provide a device of this character whereby a wheel, the movement of which is being restrained, may be easily and quickly released by the attendant while he is standing at a safe distance from the plane.

Another object is to provide a device of this kind which is of extremely simple construction but which is nevertheless safe and not easily gotten out of order.

Other objects and advantages will be evident from the following detailed description, as well as from the drawing, wherein Fig. 1 is a top plan view of the device, Fig. 2 is a sectional view taken on the line 2—2 of Fig. 1, and Fig. 3 is a side elevation.

Like numerals refer to like parts throughout the drawing.

In the drawing, a base 10 consists of a flat plate having several rows of corrugations 12 crosswise on the underside and a patch of corrugations 14 on the upper side. The base is of sufficiently large area to prevent its sinking to any appreciable extent when the earth is soft or loose. The corrugations 12 prevent endwise slipping on concrete or other hard surfaces while the corrugations 14 prevent slipping of the tire on the base. A part of the rear edge of the base is beveled as at 15 so that a wheel may roll upon it more easily.

On the smooth portion of the upper surface of the base 10 two chock blocks 16 and 18 are hinged by shoulder screws 20 which have threaded portions 22 extending into tapped holes in the base and smooth round portions 24 which are a running fit in holes in the blocks.

The forward ends of the chock blocks may be as high as the radius of the average wheel which is to be blocked, the rearward end sloping downward to the hinge ears 26 through which the hinge pins 20 extend. Interfacing sides of the blocks 16 and 18 are concaved as at 17 and 19 to receive a wheel 21. The concaved surfaces 17 and 19 had preferably not conform too closely to the shape of the wheel tire but had rather form a more or less wedge shaped cavity so that forward bearing of the wheel in the cavity tends to wedge the blocks apart and let the wheel roll through. Stops 23 arrest inward swinging of the blocks while their interfacing surfaces are still slightly spaced apart.

Near the forward end of the blocks 16 and 18 is a latch plunger 28, which is necked down to a smaller diameter at 30 leaving a shoulder 32. The blocks 16 and 18 are provided respectively with holes 34 and 36 into which the plunger 28 fits slidably. The hole 36 has a reduced diameter at 38 which receives the smaller part 30 of the bolt loosely, thereby providing a shoulder 40 for the shoulder 32 to engage. The outer end of the bolt is cross drilled at 42 for a small rope 44, by which the bolt is withdrawn from the hole 34. The shoulders 32 and 40 are so located that they will engage each other when the plunger 28 is completely withdrawn from the hole 34.

An eyebolt 46 is anchored in the block 16 and is provided with a length of cord 48 by which the block 16 may be manually swung outwardly on the hinge 20 when there is no force tending to roll the wheel 21 forward.

Operation

In operation, the device with the latch bolt 28 fully inserted is placed before a landing gear wheel 21 of an airplane and the wheel rolled forward upon the base 10 either by manual effort or by the power of the aircraft engine. When the wheel wedges between the blocks 16 and 18 by bearing against the surfaces 17 and 19, the tendency is to swing the blocks apart about the hinges 20.

As soon, however, as the blocks start to swing apart about the hinges 20, the latch plunger 28 binds in the holes 34 and 36. The engine may now be idled or run to warm it as desired.

When the pilot is ready to take off, he so signals the attendant who, standing at a safe distance, gives a slight tug on the rope 44 and thereby pulls the plunger 28 clear of the hole 34 whereupon the blocks 16 and 18 spread apart and the wheel rolls forward between them.

It may sometimes happen that the device has been placed, and because of a change in plans or for other reasons, the engine has not been started and no forward pressure is being exerted to wedge the blocks 16 and 18 apart, yet it becomes desirable to swing the blocks apart. In such a case the rope 48 as well as the rope 44 may be pulled to swing both blocks clear of the wheel so that the wheel may be manually rolled through between the blocks.

Having described an embodiment of the invention, it is claimed:

1. A wheel chock comprising a base, a pair of chock blocks movable laterally on said base, the interfacing surfaces of said blocks being so shaped that a wheel moving forwardly therebetween must push said blocks apart, and latch means for holding said blocks from being pushed apart but operative to be released to permit said blocks to spread to allow said wheel to pass therebetween.

2. A wheel chock comprising a base, a pair of chock blocks swingable about one point on said base with interfacing surfaces at the swingable ends shaped out to give such bearing to the tire of a wheel that the tire moving forwardly therethrough must swing said ends apart, latch means for holding said swingable ends from being pushed apart, and means to release said latch means.

3. A wheel chock comprising a base, a pair of chock blocks secured at one end to said base by vertical hinge means, whereby the free ends of said blocks may swing in a horizontal plane, two lateral surfaces of said blocks being adjacent and so concaved that a rubber tired wheel rolling forwardly therethrough must push said free ends apart, latch means to hold said free ends from spreading, and manual means to release said latch means.

4. A wheel chock comprising a base, a pair of chock blocks hinged by vertical hinge pins to the base at the rear ends of the blocks, whereby the front ends of the blocks may swing together or swing apart in a horizontal plane, adjacent sides of said blocks when swung together being concaved to provide bearings for the rubber tire of a wheel, said bearings being at such angle that the wheel may push the front ends of the blocks apart by rolling forward therebetween, latch means for holding the said front ends from being pushed apart, and manual means to release said latch means.

5. A wheel chock comprising a base, a pair of chock blocks supported at their rear ends on said base by vertical hinge pins, the front ends being adjacent but swingable apart on said pins in a horizontal plane, the interfacing sides being concaved to provide such contact for the tire of a wheel that the wheel in rolling forward will push the blocks apart, and means for releasably holding the adjacent ends of said blocks close together, said means comprising a plunger extending slidably through the front ends of said blocks transversely of the wheel travel.

6. A wheel chock comprising a base having a portion of its top and bottom corrugated, a pair of chock blocks having the rear ends positioned on said base by vertical hinge pins, the front ends of said blocks being adjacent but swingable apart on said hinge pins in a horizontal plane, the interfacing sides being shaped out to form a pocket for receiving the outside of a wheel, said wheel having such bearing on said shaped out portion that said wheel in rolling forward must push said blocks apart, stops for holding said front ends from swinging closer together, and means for releasably holding said blocks from swinging farther apart.

JENNIE M. STALEY,
*Administratrix of the Estate of Hobart Staley, deceased.*